UNITED STATES PATENT OFFICE 2,383,392

ACID ESTERS OF ALKYLATED 1,4-NAPHTHO-HYDROQUINONES AND PROCESS FOR THE MANUFACTURE OF SAME

Walter Karrer, Riehen, near Basel, Switzerland, assignor to Hoffmann-La Roche Inc., Nutley, N. J., a corporation of New Jersey No Drawing. Application July 25, 1940, Serial No. 347,530. In Switzerland October 24, 1939

8 Claims. (Cl. 260—479)

Recent investigations have shown that vitamin K is 2-methyl-3-phytyl-1,4-naphthoquinone. The antihemorrhagic action of vitamin K also appertains to other alkylated 1,4-naphthoquinones, above all, for instance, to the simplest representative of this group, 2-methyl-1,4-naphthoquinone. This compound has proved to be four times as effective as natural vitamin K.

For practical use, however, 2-methyl-1,4-naphthoquinone has two disadvantages: It has an irritant action and it is not soluble in water. Starting from the corresponding hydroquinone compound the di-acetic ester was prepared which also has a strong vitamin K action. Thereby, a considerable reduction of the irritant action of the quinones could be attained, but the disadvantage of insolubility in water remained.

It has now been found that this disadvantage can also be overcome if dibasic acids, e. g., succinic acid, are used for the formation of esters. Acid di-esters are thereby obtained, e. g., the acid succinic ester, having the following formula:

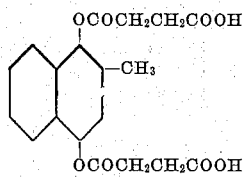

For the manufacture of acid esters of alkylated 1,4-naphthohydroquinones the alkylated naphthohydroquinones and anhydrides of dibasic acids are caused to react together by fusion or in suitable solvents. Acid esters of naphthohydroquinones were hitherto unknown. They are easily soluble in the calculated quantity of alkyli forming neutral aqueous solutions and are therefore well suited for therapeutic use.

Example 1

1 part by weight of 2-methyl-1,4-naphthohydroquinone is heated with 6 parts by weight of succinic anhydride until molten and kept for three hours at this temperature. The molten mass is then poured on ice and well triturated four times with 40 parts by weight of water each time. The undissolved residue is dissolved in as little hot methyl alcohol as possible and the solution mixed with the same volume of water, whereupon the succinic ester crystallises out. After renewed recrystallisation from dilute methyl alcohol, 2-methyl-1,4-bisuccinyl-naphthohydroquinone is obtained in the pure state, melting at 177° C.

Example 2

1 part by weight of 2,3-dimethyl-1,4-naphthohydroquinone is melted with 5 parts by weight of succinic anhydride for three hours, then poured on ice and four times well washed out with 40 parts by weight of water each. The residue is twice recrystallised from hot methyl alcohol, whereby the pure 2,3-dimethyl-1,4-bisuccinyl-naphthohydroquinone is obtained in colourless needles or narrow prisms, melting at 203–204° C.

Example 3

1 part by weight of 2-methyl-1,4-naphthohydroquinone is heated with 3 parts by weight of adipic anhydride in an oil bath until melting sets in and the mass kept in the molten state for seven hours (temperature of oil bath 110–120° C.). A stream of carbon dioxide is allowed to pass over the product so long as it remains melted. Then the melt is triturated with 100 parts by weight of ice water, dissolved in 40 parts by weight of hot methyl alcohol and the solution cooled with ice. The precipitate which mainly consists of adipic acid is separated, the filtrate then concentrated to one-half and mixed with water. The precipitated brown oil is dissolved in a little hot methyl alcohol, a little carboraffine added to the solution and filtered. After cooling, the precipitated crystalline deposit is sucked off, the mother liquor concentrated, whereupon still more substance crystallises out. By recrystallising again from methyl alcohol, 2-methyl-1,4-mono-adipyl-naphthohydroquinone is obtained in small white needles. The material is insoluble in water, easily soluble in alkali.

Example 4

1 part by weight of 2-methyl-1,4-naphthohydroquinone is dissolved in 10 parts by weight of dry pyridine. Gradually 1½ parts by weight of finely pulverised succinic anhydride are added to this solution under an atmosphere of nitrogen. The pyridine solution is allowed to stand at room temperature for 2 days and then slowly introduced into 45 parts by weight of ice-cooled 15 per cent sulphuric acid while stirring, after which the solution should act acid to Congo paper. The precipitated residue of disuccinic ester is sucked off, washed with a little water and dried. The compound is recrystallised from 10–12 parts by weight of hot acetic ethyl ester and, following this, if necessary, from hot methyl alcohol. Thereby, 2-methyl-1,4-bisuccinyl-naphthohydroquinone is obtained in a pure state.

I claim:
1. An acid ester of an alkylated 1,4-naphthohydroquinone selected from the group consisting of a 2-lower-alkyl-1,4-naphthohydroquinone and a 2,3-di-lower-alkyl-1,4-naphthohydroquinone with an unsubstituted saturated aliphatic dicarboxylic acid having from 4 to 6 C atoms.
2. The 2-methyl-1,4-bisuccinyl-naphthohydroquinone.
3. The 2,3-dimethyl-1,4-bisuccinyl-naphthohydroquinone.
4. The 2-methyl-1,4-monoadipyl-naphthohydroquinone.
5. A process for the preparation of an acid ester of an alkylated 1,4-naphthohydroquinone selected from the group consisting of a 2-lower-alkyl-1,4-naphthohydroquinone and a 2,3-di-lower-alkyl-1,4-naphthohydroquinone with a dibasic acid, which process comprises reacting an alkylated 1,4-naphthohydroquinone selected from the group consisting of a 2-lower-alkyl-1,4-naphthohydroquinone and a 2,3-di-lower-alkyl-1,4-naphthohydroquinone with an anhydride of an unsubstituted saturated aliphatic dicarboxylic acid having from 4 to 6 C atoms.
6. Process for the manufacture of 2-methyl-1,4-bisuccinyl-naphthohydroquinone, comprising reacting 2-methyl-1,4-naphthohydroquinone with succinic anhydride.
7. Process for the manufacture of 2,3-dimethyl-1,4-bisuccinyl-naphthohydroquinone, comprising reacting 2,3-dimethyl-1,4-naphthohydroquinone with succinic anhydride.
8. Process for the manufacture of 2-methyl-1,4-monoadipyl-naphthohydroquinone, comprising reacting 2-methyl-1,4-naphthohydroquinone with adipic anhydride.

WALTER KARRER.